United States Patent [19]
Bentley

[11] 3,868,105
[45] Feb. 25, 1975

[54] BIDIRECTIONAL HYDRODYNAMIC SHAFT SEAL

[75] Inventor: Gustavus A. Bentley, Ann Arbor, Mich.

[73] Assignee: Federal-Mogul Corporation, Southfield, Mich.

[22] Filed: Oct. 10, 1972

[21] Appl. No.: 296,077

[52] U.S. Cl. .............................................. 277/134
[51] Int. Cl. ............................................. F16j 15/32
[58] Field of Search .................................... 277/134

[56] References Cited
UNITED STATES PATENTS
3,640,542  2/1972  Mowat .............................. 277/134
3,790,180  5/1971  Heyn et al. ....................... 277/134
FOREIGN PATENTS OR APPLICATIONS
306,207  2/1969  Sweden ............................. 277/134

Primary Examiner—Samuel B. Rothberg
Attorney, Agent, or Firm—Owen, Wickersham & Erickson

[57] ABSTRACT

A bidirectional hydrodynamic shaft seal in which the frustoconical air side of the sealing lip edge has a plurality of crescent-shaped projections. Each of these projections forms a cylindrical segment having the same radius as the lip edge, each projection converging towards the lip edge from both horns of the crescent. The radially inner surface of each projection meets the lip edge tangentially in both directions and is, where they meet, axially wider than the lip edge. Between the two places where the crescent-shaped projection meets the lip edge, the projection integral with the lip edge, forming a common surface with it, and this common surface has a circumferential length which is substantially longer than the axial width of the lip edge.

5 Claims, 7 Drawing Figures

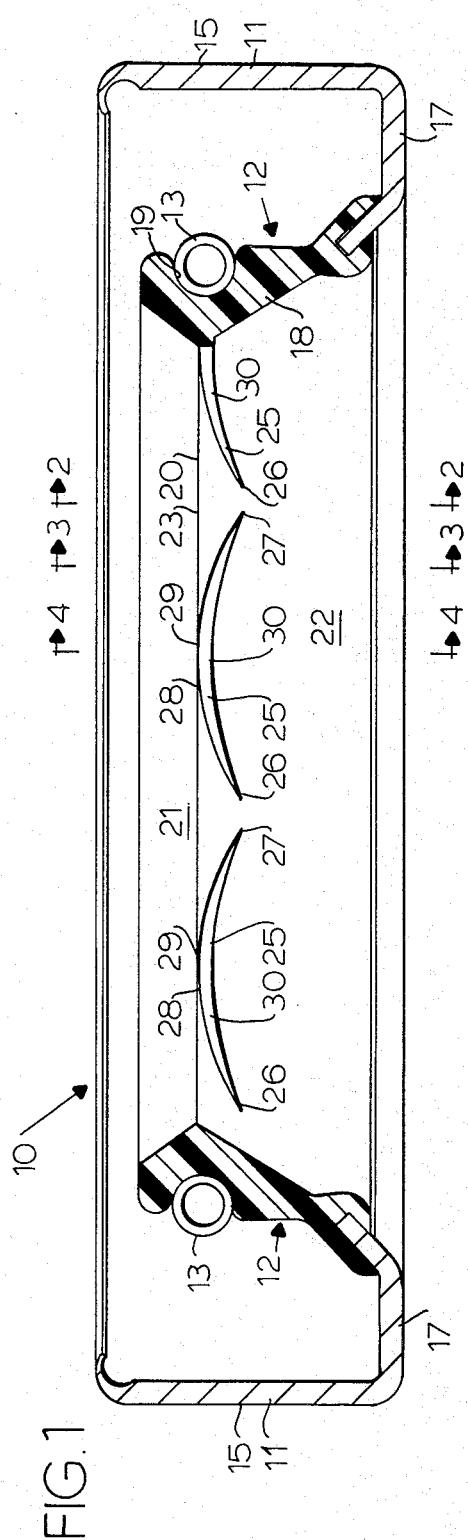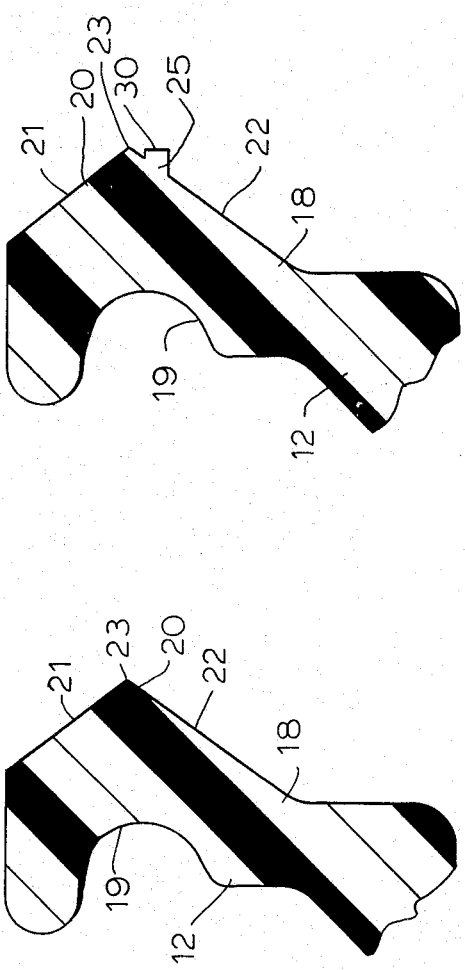

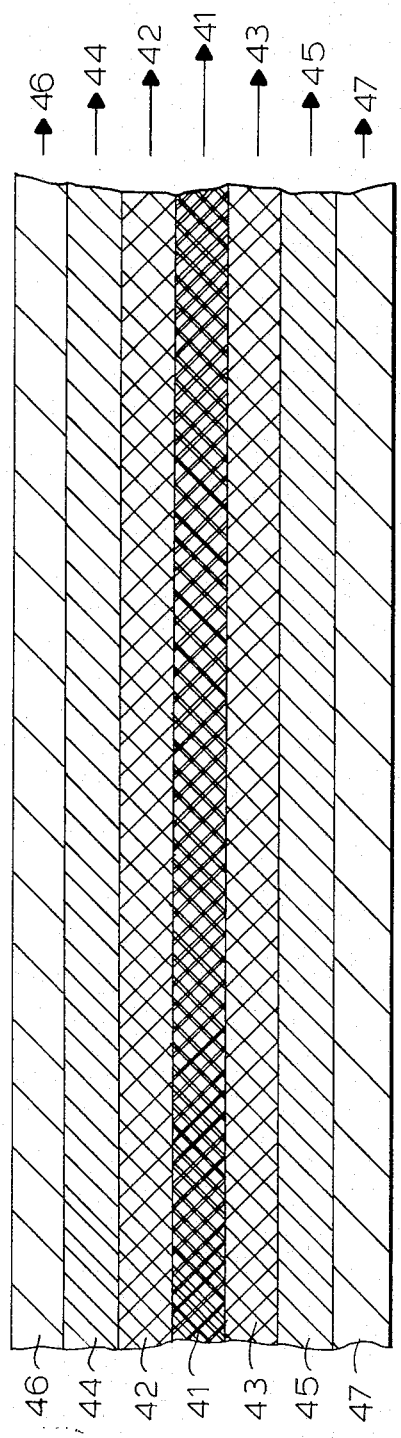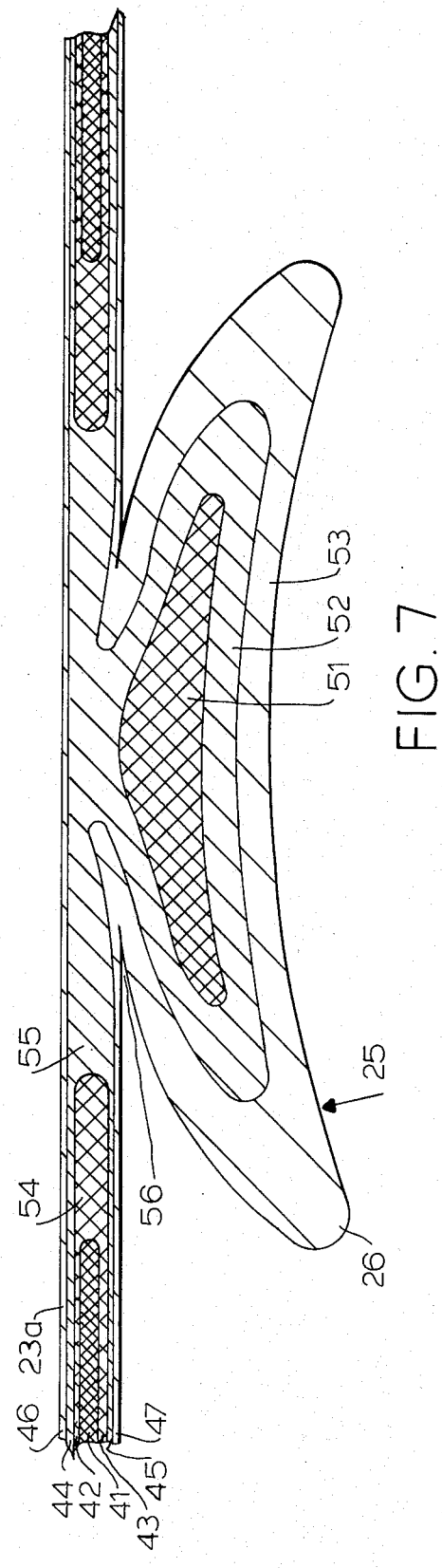

BIDIRECTIONAL HYDRODYNAMIC SHAFT SEAL

BACKGROUND OF THE INVENTION

This invention relates to a bidirectional hydrodynamic shaft seal of the type having a rigid bore-contacting case and an elastomeric sealing element that is molded to shape while it is bonded to the case.

Many attempts have been made to achieve consistent bidirectional hydrodynamic sealing action in a shaft seal. By hydrodynamic sealing action is meant the kind of action which harnesses shaft rotation to return to the oil side of the sealing lip any oil which has been able to leak past the sealing lip, due to scratches on the shaft, to minor defects in the sealing lip, or to the presence of foreign matter at the edge of the sealing lip. The term "hydrodynamic action" expresses the ability of the seal to act in cooperation with the rotating shaft to return that oil to the oil side of the lip, so that there is no apparent or objectionable leakage.

There has been a considerable degree of misunderstanding of "hydrodynamic action" and a large amount of misinformation as to when, why, and how hydrodynamic action takes place. Many of the structures that are supposed to be hydrodynamic have failed to produce consistent hydrodynamic action, indicating that the theories upon which they were based have been erroneous. The mere provision of ribs or grooves that during rotation tend to redirect oil leakage back toward the edge of the sealing lip is insufficient in itself to cause hydrodynamic action, even when the shaft is rotating rapidly with considerable centrifugal force, and the alleged criticality of various angles that such ribs or grooves made with the edge of the sealing lip has also proven to be non-factual and insufficient to impart hydrodynamic action. An interesting phase of this latter theory is that the present invention employs or can employ a tengency, in effect, an angle closely approaching zero degrees, whereas according to much prevalent theory an approach angle of zero degrees could not provide hydrodynamic action. Yet, in fact, the seal of this invention has been tested, and it consistently provides hydrodynamic action in both directions of rotation.

SUMMARY OF THE INVENTION

The hydrodynamic action in the present invention is provided by a combination of certain lip shapes with certain critical dimensions which act to provide at certain critical areas a pressure gradient that ensures the return of oil from the air side to the oil side of the sealing lip.

The frustoconical air side of the preferred form of seal of this invention has a plurality of projections, preferably crescent-shaped, which converge toward the lip edge from both horns. The radially inner surfaces of these projections meet the lip edge tangentially, preferably, in both directions. If an actual crescent-shape is not used, there may be an actual approach angle rather than tangential meeting, since tangency is not completely necessary. What is necessary is that the radially inner surface of the projections be at the same radius as the lip edge and during actual running conditions, be axially wider at the meeting point than is the lip edge. It is also necessary for the circumferential length between the two points of tangency where the radially inner surface of the projection meets and leaves the lip edge to be longer than the axial width of the lip edge, as measured under actual running conditions.

It is believed that the common lip seals, whether they have hydrodynamic action or not, rely heavily on the pressure gradient within the oil film that separates the seal lip from the shaft. If a particle of oil passes across the highest pressure at the median of the pressure gradient pattern, it then tends to go the rest of the way in that direction, because it is in effect going downhill; that is, the pressure keeps urging it to continue in that direction. Any discontinuity or irregularity which tends to move oil from the oil side of a seal past the point of its highest pressure under the lip of a seal makes the seal leak. The leak could result from this pressure gradient in the instance of a worn shaft or a foreign particle being present between the shaft and the lip or a torn lip or a scratched shaft, and so on. In all these cases a pressure gradient is set up, and in all cases there is a discontinuity or irregularity in this pressure gradient of the film which gets the oil past the point of highest pressure and starts it going down on the other side of the pressure gradient.

In the present invention the situation is made to work in reverse to provide the desired hydrodynamic action. This can be done by a proper configuration of hydrodynamic flutes, which by design transfer the oil from the air side past the area of highest pressure and towards the oil side. This is, in other words, a pressure inversion, or a controlled irregularity of the pressure gradient.

This is the significance of the difference in dimensions. Thus, the width of the lip edge and its relation to the width of the surface portion of the flute or rib or projection at the point where the projection meets the lip edge are rather critical factors. By this we are speaking of the actual widths under running conditions, rather than under the width of the seal as it may be manufactured. Shaft interference may serve to increase the actual width of the lip edge, as may wear of the shaft, but the present invention particularly views the lip as molded. The projection employed in the present invention may preferably be crescent-shaped, meeting and leaving the shaft in a footprint with a smooth curve in the preferable form; each crescent has two horns, and each one of these horns comes in toward the sealing lip edge and preferably meets the sealing lip edge at a point of tangency. The structure, however, need not be precisely crescent-shaped and it may actually come in at an angle and still achieve substantially the same effect, so long as the relative proportions of the footprints concerned here are provided. By having the width of the footprint greater than the width of the sealing lip footprint at the point where the two meet, and by having them meet with this relationship over a circumferential length greater than the axial width of the sealing lip edge, the pressure gradient is such that the maximum point of the pressure gradient shifts axially over from beneath the middle of the lip edge to beneath the middle of the combined footprints, directly after the meeting of the projection and the lip edge. As a result, the crescent-shaped projection, through its footprint, acts to change the pressure gradient to the middle of the combined width of the lip edge and the crescent shaped projection during all the time that the two are in contact. By having the width of the crescent portion of the footprint substantially greater, preferably two or three times as great as the sealing lip edge, the pressure gradient is affected, so that the highest pressure point comes in the middle of the total dimension, that is, the width of the lip edge plus the width of the crescent-shaped projection at that point, and therefore the midpoint shifts over beyond the point where the oil is being guided between the projection and the lip edge. Since the oil is entering in between the two, the oil film that is generated as it is moved circumferentially by the rotating shaft is subjected to a pressure inversion, which thereby causes the oil to pass under the sealing lip edge and back to the oil side of the seal.

Other objects and advantages of the invention will appear from the following description of some preferred embodiments.

BRIEF DESCRIPTION OF THE DRAWINGS

In the drawings:

FIG. 1 is a view in diametral section of a bidirectional hydrodynamic shaft seal embodying the principles of this invention.

FIG. 2 is a fragmentary view in section taken along the line 2—2 in FIG. 1.

FIG. 3 is a fragmentary view in section taken along the line 3—3 in FIG. 1.

FIG. 6 is a diagrammatic view in section of pressure distribution in a conventional non-hydrodynamic seal at the sealing edge thereof where it engages the shaft.

FIG. 7 is a similar view of a portion of one of the footprints of the seal of the present invention.

DESCRIPTION OF A PREFERRED EMBODIMENT

Figure 4:
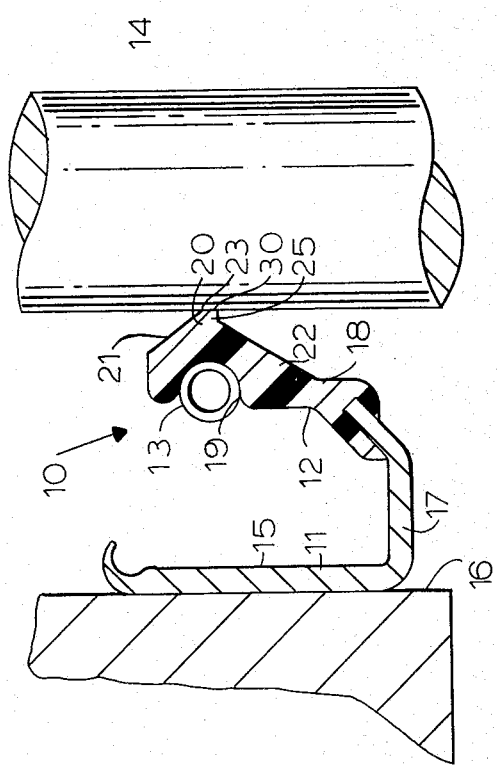
FIG. 4 is a view in section taken along the line 4—4 in FIG. 1 and also showing a portion of the shaft and bore with which the seal is in engagement.

One example of a seal 10 of this invention is shown in FIGS. 1–5 as a continuous annulus comprising three major elements, namely, a metal case 11, an elastomeric element 12 bonded to the metal case 11 during molding, and a garter spring 13 urging the elastomeric member 12 toward a shaft 14 (see FIG. 4). The metal case 11 has a cylindrical portion 15 providing a press fit and a seal in a bore 16 (FIG. 4), and, in this instance, a radial flange 17 to which the elastomeric member 12 is anchored. the elastomeric element 12 has a body 18 with a groove 19 to receive the garter spring 13, and it has a lip 20 provided by two converging frustoconical portions 21 and 22 which meet at a sealing lip edge 23. Preferably this edge 23 is quite sharp, though it may be designed for a certain amount of shaft interference and thereby in actual running condition may have, and in fact does have, some finite width. Such a lip edge 23 provides a good static seal and normally runs properly, though, under certain conditions beyond its control, some oil may leak through; usually these conditions involve scratches on the shaft 14 or similar defects which a standard lip seal cannot overcome.

Figure 5:
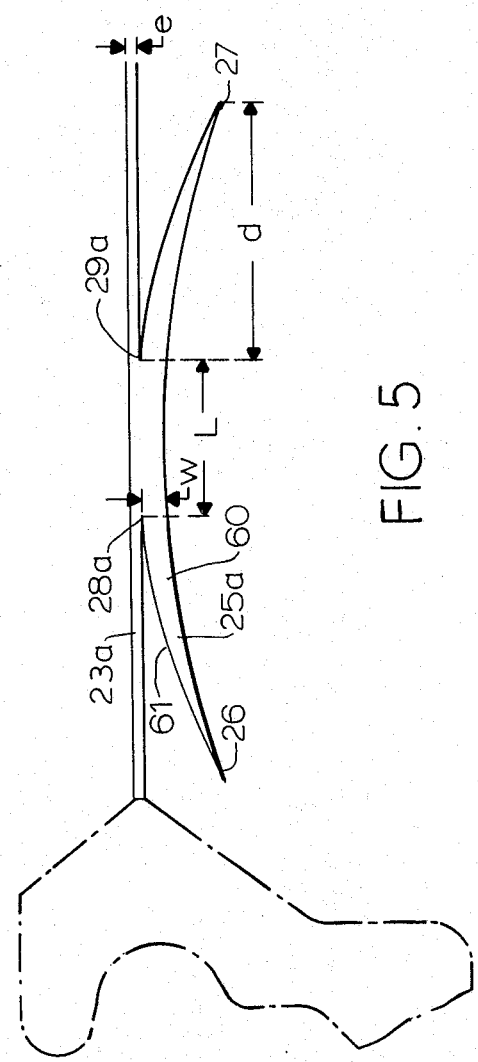
FIG. 5 is a partial view of a typical footprint of some of the sealing lip edge and one hydrodynamic flute, showing some dimensions and indicating in broken lines at one end a cross section of the sealing lip.

In this invention, hydrodynamic action is provided by the addition of some integrally molded portions of the elastomeric element 12 providing a series of crescent shaped projections 25 or flutes which have the same radius and the same curvature as the static lip 23, and therefore only slightly smaller than the shaft 14, so that the footprint is as shown in FIG. 5. These projections 25 are preferably crescent-shaped, having two horns 26 and 27 at their extreme ends. Each projection 25 converges toward the lip edge 23, the radially inner surface 30 of each projection 25 meets the lip edge 23 approximately tangentially at points 28 and 29. In between the meeting points 28 and 29, the surface 30 of the projection 25 continues integral with the lip edge 23. Thus the seal 10 is bidirectional, in the sense that when the shaft 14 is rotated in either direction there will be a point 28 or 29 of entering tangency and a point 29 or 28 of leaving tangency.

As shown in FIG. 5, the width W of the crescent shaped portion 25a of the footprint 40 at the places 28a and 29a where that portion 25a meets the footprint portion 23a of the lip edge 23 is much wider than the width e of the footprint portion 23a of the lip edge, preferably being two or three times as wide, though hydrodynamic action can be obtained so long as it is at least wider. Also, the length L between the two points of tangency 28a and 29a is substantially greater than the width e of the footprint 23a of the lip edge, in this instance many times. The important point is that it be at least greater than the width of the lip edge, and as said, it is preferable when it is several times as great.

Under these conditions, the oil that leaks out beyond the lip edge 23 through some pressure inversion is caught by subsequent crescent horn 26 or 27 and returned to the oil side of the lip edge 23 by another forcibly induced pressure inversion, resulting from a controlled discontinuity in the pressure gradient.

A probable theory of the operation is as follows:

When a conventional seal is installed on a shaft, its lip exerts a force against the shaft. This force is usually referred to as radial load. This load causes the elastic seal element to deform at the lip resulting in a portion of this lip surface coming into actual contact with the shaft, and the portion in actual contact with the shaft is conventionally called "the footprint," shown at reference numeral 40 in FIG. 5. Assume that this radial load is constant over the circumference of the lip-shaft interface, and that no fluid or other material exists between the two surfaces. This radial load will be distributed over the footprint area 40 resulting in radial pressure. The pressure is also distributed over the footprint area and this distribution is determined by the lip geometry. For a conventional, non-hydrodynamic seal, this distribution may look as shown in FIG. 6, with the greatest pressure in the central strip 41, the next greatest at strips 42 and 43, lower pressure at the strips 44 and 45, and the least pressure at the outer edge strips 46 and 47.

This distribution may be changed by adding local areas to the footprint. Such areas may be caused by the presence of flutes, such as the crescent shaped projections 25.

Consider FIG. 7 as an approximate distribution of the pressure between the shaft 14 and a segment of a seal embodying the present invention. Again, assume constant radial load. It is also assumed that in operation, the presence of an oil film between the two surfaces does not substantially change the distribution, although the radial dimension between the shaft and seal may be slightly increased. Here there are again pressure distribution areas, 41, 42, 43, 44, 45, 46, and 47 along the lip edge's footprint 23a, but there are also pressure areas 51, 52, and 53 in the crescent. The areas 42 and 43 merge into the area 54; the areas 44 and 45 merge into the area 55 which merges with the area 52; the area 47 merges into the area 53.

As long as no fluid escapes past the main sealing lip edge 23, the flutes of the crescent 25 are not functional.

Consider now the condition where the fluid being sealed has passed under the main lip edge 23, and is no longer contained. The adhesion between the fluid and shaft 14 will cause the fluid to travel with the shaft 14. Provided that nothing intervenes, this condition continues until the leakage has accumulated to a point where the fluid flows from the shaft 14 due to the effects of centrifugal force and gravity. If however this fluid which is rotating with the shaft 14 is subjected to opposition, its tendency to flow with, or be carried by the shaft 14 will be changed. This opposition here is in the form of flutes of projections 25.

When the fluid reaches the flute 25, it is subjected to several pressures. First, the presence of the flute 25 tends to prevent further circumferential travel. At the same time, shaft rotation continues to urge the fluid along a circumferential path. This results in a pressure increase within the fluid itself. At this point, the fluid is being confined in a V-shaped space 56 formed by the seal lip edge 23, and the horn 26 of the flute 25. As the fluid pressure increases due to shaft rotation, a point will be reached where flow will re-occur, in the direction of least resistance. This direction depends upon the magnitude of pressure increase in relation to the seal pressure distribution represented in FIG. 7. If the pressure of the seal on the shaft is great enough in all areas, fluid will back up, filling the V-shaped area 56, and additional fluid will flow around the outboard end 26 of the flute 25 resulting in leakage. If the pressure under the horn or flute 25 is reduced, yet that under the main seal lip is still great enough, fluid will flow under and past the flute again resulting in leakage. It can be understood that combinations of these two cases may occur.

If, however, flute pressure is high with respect to that at the seal lip, and fluid pressure due to shaft rotation is sufficient, fluid will be forced into the Vee and back under the lip edge 23, returning to the oil side of the seal. This is to say that the properly designed seal element produces a pressure distribution which will provide an oil return path, preventing leakage.

There is a wide range of feasible proportions and shapes that can provide operability hydrodynamically. Preferably, $W \leq 2e$ and $L \leq 3e$. The distance $d$ from the end of either horn of the crescent to the meeting point of the crescent with the lip edge is preferably $d \leq 3e$. The crescent may provide an arc of about 30° between itself and the lip edge, and may be made up of a first curve 60 (see FIG. 5) of radius R1 and a second curve 61 of a shorter radius R2, so that R1>R2. The curve 61 is preferably tangent to the midpoint of the lip edge 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A bidirectional hydrodynamic shaft seal of the type having a rigid bore-contacting case and an elastomeric sealing element with a sealing lip wherein two frustoconical surfaces converge to a circular lip edge for providing a static rotary seal with a rotating shaft, said lip having an air side and an oil side, characterized by the frustoconical air side of said lip having a plurality of crescent-shaped projections, the inner radial surface of each said crescent-shaped projection forming a cylindrical segment having the same radius as said lip edge, said surface segment converging axially toward said lip edge from both horns of the crescent and meeting said lip edge tangentially from both directions, said crescent surface when the seal is in contact with a shaft providing a footprint that, where it meets the lip, is axially wider that is the footprint of said lip edge during actual running conditions, the two points of convergence being apart from each other by a distance substantially greater than the width of said lip edge during actual running conditions.

2. The shaft seal of claim 1 wherein the axial width of the crescent-shaped portion at the points where it meets the lip edge is at least twice as great as the axial width of the lip edge.

3. A bidirectional hydrodynamic shaft seal of the type having a rigid bore-contacting case and an elastomeric sealing element supported by and sealed to said case, said sealing element having a sealing lip wherein two frustoconical surfaces converge to a circular lip edge for providing a static rotary seal on engagement with a rotating shaft, said lip being molded to provide an as-molded lip edge and having an air side and an oil side, comprising a series of molded crescent-shaped projections extending out from the frustoconical air side of said lip each said crescent-shaped projection having on its radially inner surface a cylindrical segment with the same radius as said lip edge, each said surface segment converging in an axial direction toward said as-molded lip edge from both horns of the crescent and meeting said lip edge tangentially from both directions, said surface segment being at the meeting points substantially axially wider than said lip edge, the two meeting points being further apart circumferentially than the width of said lip edge.

4. The shaft seal of claim 3 wherein the axial width of the crescent-shaped portion at the points where it meets the lip edge is at least twice as great as the axial width of the lip edge.

5. A bidirectional hydrodynamic shaft seal of the type having a rigid bore-contacting case and an elastomeric sealing element with a sealing lip wherein two frustoconical surfaces converge from an air side and an oil side, to a circular lip edge, comprising a series of cylindrical-surface segments on the frustoconical air side of said seal lip, each segment having the same radius as said lip edge, each said surface segment converging axially toward said lip edge from both ends and meeting said lip edge, the portions of said surface segment at the meeting points being axially wider than said lip edge during actual running conditions, the two meeting points being circumferentially further apart than the axial width of said lip edge during actual running conditions.

* * * * *